US012587304B2

(12) United States Patent
Echigo et al.

(10) Patent No.: US 12,587,304 B2
(45) Date of Patent: Mar. 24, 2026

(54) TERMINAL

(71) Applicant: NTT DOCOMO, INC., Tokyo (JP)

(72) Inventors: Haruhi Echigo, Tokyo (JP); Hiroki Harada, Tokyo (JP); Daisuke Kurita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 306 days.

(21) Appl. No.: 18/569,506

(22) PCT Filed: Jun. 18, 2021

(86) PCT No.: PCT/JP2021/023278
§ 371 (c)(1),
(2) Date: Dec. 12, 2023

(87) PCT Pub. No.: WO2022/264432
PCT Pub. Date: Dec. 22, 2022

(65) Prior Publication Data
US 2024/0283559 A1      Aug. 22, 2024

(51) Int. Cl.
*H04L 1/00* (2006.01)
*H04W 72/1268* (2023.01)
*H04W 72/232* (2023.01)
*H04W 74/0833* (2024.01)

(52) U.S. Cl.
CPC ....... *H04L 1/0003* (2013.01); *H04W 72/1268* (2013.01); *H04W 72/232* (2023.01); *H04W 74/0833* (2013.01)

(58) Field of Classification Search
CPC ....... H04L 1/0003; H04L 1/0025; H04L 1/08; H04L 1/189; H04L 1/0009; H04W 72/1268; H04W 72/232; H04W 74/0833; H04W 16/26

USPC .......................................................... 370/329
See application file for complete search history.

(56) References Cited

U.S. PATENT DOCUMENTS

| | | | | | |
|---|---|---|---|---|---|
| 12,004,169 | B2 * | 6/2024 | Lou | ........................ | H04W 72/23 |
| 12,096,443 | B2 * | 9/2024 | Elshafie | ................ | H04L 1/0005 |
| 2012/0327884 | A1 * | 12/2012 | Seo | ........................ | H04L 1/0072 |
| | | | | | 370/329 |
| 2017/0181009 | A1 * | 6/2017 | Wong | ........................ | H04L 1/189 |
| 2017/0273113 | A1 * | 9/2017 | Tirronen | ................ | H04W 72/23 |

(Continued)

FOREIGN PATENT DOCUMENTS

| | | | | | |
|---|---|---|---|---|---|
| CA | 3057389 | A1 * | 10/2018 | ............ | H04W 48/12 |
| CN | 102647248 | A * | 8/2012 | ............ | H04W 72/23 |

(Continued)

OTHER PUBLICATIONS

3GPP TSG RAN meeting #90e; RP-202928 "New WID on NR coverage enhancements" China Telecom; Electronic Meeting, Dec. 7-11, 2020 (13 pages).
3GPP TSG RAN WG1 #104-e; R1-2100461 "Discussion on Type A PUSCH repetition for Msg3" vivo; e-Meeting, Jan. 25-Feb. 5, 2021 (8 pages).

(Continued)

*Primary Examiner* — Mahendra R Patel
(74) *Attorney, Agent, or Firm* — Osha Bergman Watanabe & Burton LLP

(57) ABSTRACT

This terminal includes: a reception unit that receives a response message in a random access channel procedure; and a control unit that, on the basis of information contained in uplink permission contained in the response message, determines the number of uplink signal repetitions scheduled in the uplink permission.

12 Claims, 10 Drawing Sheets

(56)        References Cited

U.S. PATENT DOCUMENTS

| 2022/0094473 | A1 * | 3/2022 | Nimbalker | ............ | H04L 1/1664 |
| 2023/0028762 | A1 * | 1/2023 | Choi | .................... | H04L 5/0094 |

FOREIGN PATENT DOCUMENTS

| CN | 116250295 | B | * | 8/2025 | .......... | H04W 52/325 |
| EP | 3512138 | A1 | * | 7/2019 | ............ | H04W 76/11 |
| JP | 2017510160 | A | | 4/2017 | | |
| JP | 2018532324 | A | | 11/2018 | | |
| TW | 201330558 | A | * | 7/2013 | .......... | H04L 1/1858 |
| WO | WO-2013022301 | A2 | * | 2/2013 | ............ | H04L 5/001 |
| WO | WO-2017196114 | A1 | * | 11/2017 | .............. | H04L 1/00 |
| WO | WO-2020065977 | A1 | * | 4/2020 | ............ | H04W 72/23 |

OTHER PUBLICATIONS

3GPP TSG RAN WG1 #105-e; R1-2105225 "Type A PUSCH repetitions for Msg3" ETRI; e-Meeting, May 10-27, 2021 (3 pages).

3GPP TSG RAN WG1 #104e; R1-2101627 "Type A PUSCH repetitions for Msg3 for coverage enhancements" NTT DOCOMO, Inc.; e-Meeting, Jan. 25-Feb. 5, 2021 (4 pages).

International Search Report issued in International Application No. PCT/JP2021/023278, mailed Dec. 28, 2021 (3 pages).

Written Opinion issued in International Application No. PCT/JP2021/023278; Dated Dec. 28, 2021 (4 pages).

Office Action issued in Japanese Application No. 2023-529187, mailed Jun. 28, 2024 (6 pages).

* cited by examiner

| TPC Command | Value (in dB) |
|:-----------:|:-------------:|
| 0 | –6 |
| 1 | –4 |
| 2 | –2 |
| 3 | 0 |
| 4 | 2 |
| 5 | 4 |
| 6 | 6 |
| 7 | 8 |

| bit field | NUMBER OF REPETITIVE TRANSMISSIONS |
|-----------|-----------------------------------|
| 0 | 1 |
| 1 | 2 |

FIG. 5A

| bit field | NUMBER OF REPETITIVE TRANSMISSIONS |
|-----------|-----------------------------------|
| 0 | 2 |
| 1 | 3 |

FIG. 5B

| bit field | NUMBER OF REPETITIVE TRANSMISSIONS |
|-----------|-----------------------------------|
| 0 | 2 |
| 1 | 4 |

FIG. 5C

| bit field | NUMBER OF REPETITIVE TRANSMISSIONS |
|-----------|-----------------------------------|
| 0 | 1 |
| 1 | 2 |
| 2 | 3 |
| 3 | 4 |

FIG. 6A

| bit field | NUMBER OF REPETITIVE TRANSMISSIONS |
|-----------|-----------------------------------|
| 0 | 1 |
| 1 | 2 |
| 2 | 4 |
| 3 | 6 (or 8) |

FIG. 6B

| bit field | NUMBER OF REPETITIVE TRANSMISSIONS |
|-----------|-----------------------------------|
| 0 | 2 |
| 1 | 3 |
| 2 | 4 |
| 3 | 6 (or 8) |

FIG. 6C

| bit field | NUMBER OF REPETITIVE TRANSMISSIONS |
|-----------|-----------------------------------|
| 0 | 2 |
| 1 | 4 |
| 2 | 6 |
| 3 | 8 |

FIG. 6D

| bit field | NUMBER OF REPETITIVE TRANSMISSIONS |
|-----------|-----------------------------------|
| 0 | 2 |
| 1 | 4 |
| 2 | 8 |
| 3 | 10 (or 16) |

FIG. 6E

| bit field | NUMBER OF REPETITIVE TRANSMISSIONS |
|-----------|------------------------------------|
| 0 | 1 |
| 1 | 2 |
| 2 | 3 |
| 3 | 4 |
| 4 | 5 |
| 5 | 6 |
| 6 | 7 |
| 7 | 8 |

FIG. 7A

| bit field | NUMBER OF REPETITIVE TRANSMISSIONS |
|-----------|------------------------------------|
| 0 | 1 |
| 1 | 2 |
| 2 | 3 |
| 3 | 4 |
| 4 | 7 |
| 5 | 8 |
| 6 | 12 |
| 7 | 16 |

FIG. 7B

| bit field | NUMBER OF REPETITIVE TRANSMISSIONS |
|-----------|-----------------------------------|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |

FIG. 8

TERMINAL

TECHNICAL FIELD

The present disclosure relates to a terminal.

BACKGROUND ART

The 3rd Generation Partnership Project (3GPP) specifies the 5th generation mobile communication system (5G, also referred to as New Radio (NR) or Next Generation (NG)), and further specifies the next generation called Beyond 5G, 5G Evolution or 6G.

For example, in 3GPP Release-17, a Work Item on Coverage Enhancement (CE) in NR has been agreed (Non-Patent Literature (hereinafter, referred to as NPL) 1).

In particular, a specification for repetitive transmissions of a PUSCH scheduled based on an RAR UL grant or DCI scrambled with TC-RNTI has been discussed. Note that RAR is an abbreviation for Random Access Response. DCI is an abbreviation for Downlink Control Information. TC-RNTI is an abbreviation for a Temporary Cell Radio Network Temporary Identifier. PUSCH is an abbreviation for a Physical Uplink Shared Channel.

CITATION LIST

Non-Patent Literature

NPL 1
"New WID on NR coverage enhancements", RP-202928, 3GPP TSG RAN meeting #90e, 3GPP, December 2020

SUMMARY OF INVENTION

There is scope for further study on a method for determining the number of repetitions of an uplink signal used for transmission of a message (Msg3) in a random access channel procedure.

An aspect of the present disclosure is to provide a terminal capable of appropriately determining the number of repetitions of an uplink signal in a random access channel procedure.

Solution to Problem

A terminal according to an aspect of the present disclosure includes: a reception section that receives a response message in a random access channel procedure; and a control section that determines a number of repetitions of an uplink signal scheduled by an uplink grant based on information included in the uplink grant included in the response message.

A terminal according to an aspect of the present disclosure includes: a reception section that receives downlink control information having scheduled retransmission of an uplink signal in a random access channel procedure; and a control section that determines a number of repetitions of the uplink signal based on the downlink control information.

BRIEF DESCRIPTION OF DRAWINGS

FIG. 4 is a diagram for describing an exemplary limitation of TPC command;
FIG. 5A illustrates exemplary mapping of a bit indicating the number of repetitions and the number of repetitions;
FIG. 5B illustrates another exemplary mapping of a bit indicating the number of repetitions and the number of repetitions;
FIG. 5C illustrates still another exemplary mapping of a bit indicating the number of repetitions and the number of repetitions;
FIG. 6A illustrates still another exemplary mapping of a bit indicating the number of repetitions and the number of repetitions;
FIG. 6B illustrates still another exemplary mapping of a bit indicating the number of repetitions and the number of repetitions;
FIG. 6C illustrates still another exemplary mapping of a bit indicating the number of repetitions and the number of repetitions;
FIG. 6D illustrates still another exemplary mapping of a bit indicating the number of repetitions and the number of repetitions;
FIG. 6E illustrates still another exemplary mapping of a bit indicating the number of repetitions and the number of repetitions;
FIG. 7A illustrates still another exemplary mapping of a bit indicating the number of repetitions and the number of repetitions;
FIG. 7B illustrates still another exemplary mapping of a bit indicating the number of repetitions and the number of repetitions;
FIG. 8 illustrates still another exemplary mapping of a bit indicating the number of repetitions and the number of repetitions.

DESCRIPTION OF EMBODIMENTS

Hereinafter, an embodiment according to an aspect of the present disclosure will be described with reference to the drawings.

Figure 1:
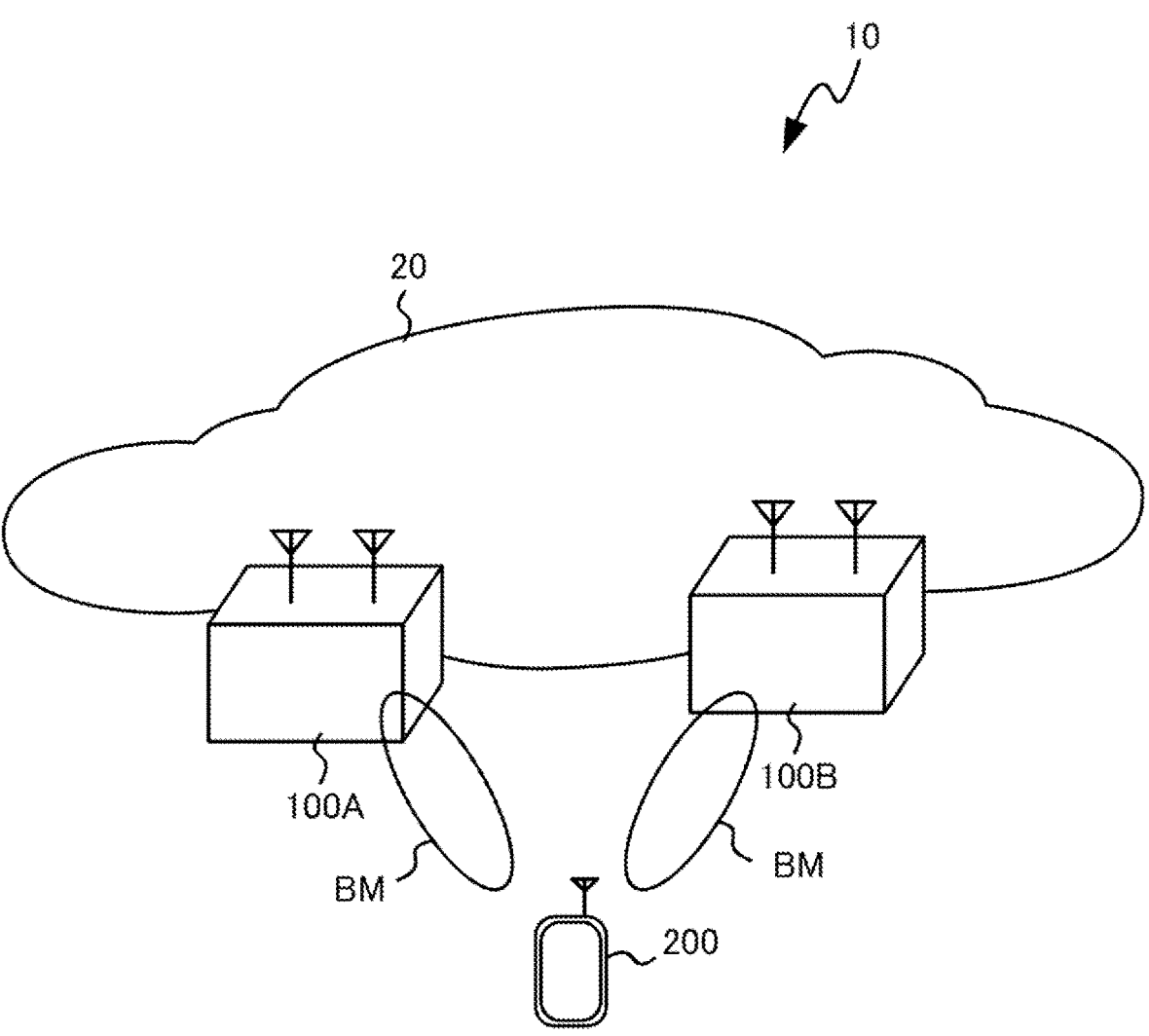
FIG. 1 illustrates an exemplary radio communication system according to an embodiment.

Embodiment (1) Schematic Overall Configuration of Radio Communication System FIG. 1 illustrates exemplary radio communication system 10 according to an embodiment. Radio communication system 10 is a radio communication system in accordance with 5G New Radio (NR) and includes Next Generation-Radio Access Network 20 (hereinafter, referred to as NG-RAN 20) and terminal 200 (hereinafter, referred to as UE 200).

Note that radio communication system 10 may be a radio communication system in accordance with a scheme called Beyond 5G, 5G Evolution, or 6G.

NG-RAN 20 includes base station 100A (hereinafter, referred to as gNB 100A) and base station 100B (hereinafter, referred to as gNB 100B). The numbers of gNBs and UEs are not limited to those illustrated in FIG. 1.

NG-RAN 20 practically includes a plurality of NG-RAN Nodes, in particular, gNBs (or ng-eNBs), and is connected to a core network in accordance with 5G (5GC, not illustrated). Note that each of NG-RAN 20 and 5GC may be simply referred to as a "network."

Both gNB 100A and gNB 100B are base stations in accordance with 5G, and perform radio communication with UE 200 in accordance with 5G. By controlling radio signals transmitted from a plurality of antennae, gNB 100A, gNB 100B, and UE 200 can support Massive MIMO generating beam BM having higher directivity, carrier aggregation (CA) using a plurality of component carriers (CC) in a bundle, dual connectivity (DC) for communicating with two or more transport blocks simultaneously between a UE and each of two NG-RAN Nodes, and the like. Note that MIMO is an abbreviation for Multiple-Input Multiple-Output.

Further, radio communication system 10 supports a plurality of frequency ranges (FR).

Figure 2:
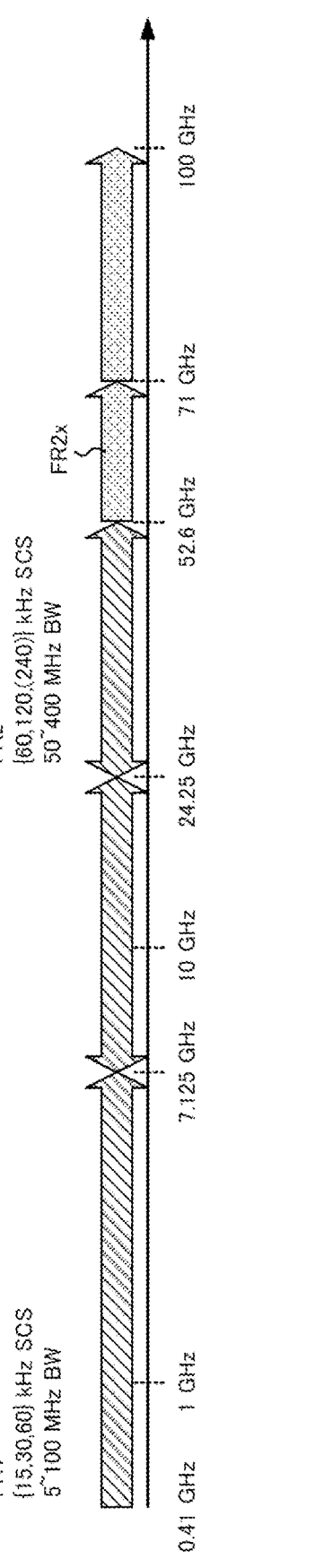
FIG. 2 illustrates an exemplary frequency range used for the radio communication system.

FIG. 2 illustrates an exemplary frequency range used for radio communication system 10. As illustrated in FIG. 2, radio communication system 10 supports FR1 and FR2. The frequency band of each of the FRs is, for example, as follows.

FR1: 410 MHz to 7.125 GHz

FR2: 24.25 GHz to 52.6 GHz

In FR1, SCS of 15, 30, or 60 kHz may be used, and a bandwidth (BW) of 5 to 100 MHz may be used. FR2 is higher than FR1, and SCS of 60 or 120 kHz (240 kHz may be included) may be used, and a bandwidth (BW) of 50 to 400 MHz may be used.

Note that SCS is an abbreviation for Sub-Carrier Spacing. SCS may be interpreted as numerology. The numerology is defined in 3GPP TS38.300 and corresponds to one subcarrier spacing in the frequency domain.

Radio communication system 10 also supports a frequency band higher than the frequency band of FR2. Specifically, radio communication system 10 supports a frequency band exceeding 52.6 GHz and up to 114.25 GHz. Such a high frequency band may be referred to as "FR2x" for convenience.

In order to solve the above-described problem, when a band exceeding 52.6 GHz is used, CP-OFDM/DFT-S-OFDM having larger SCS may be applied. Note that CP-OFDM is an abbreviation for Cyclic Prefix-Orthogonal Frequency Division Multiplexing. DFT-S-OFDM is an abbreviation for Discrete Fourier Transform-Spread.

Figure 3:
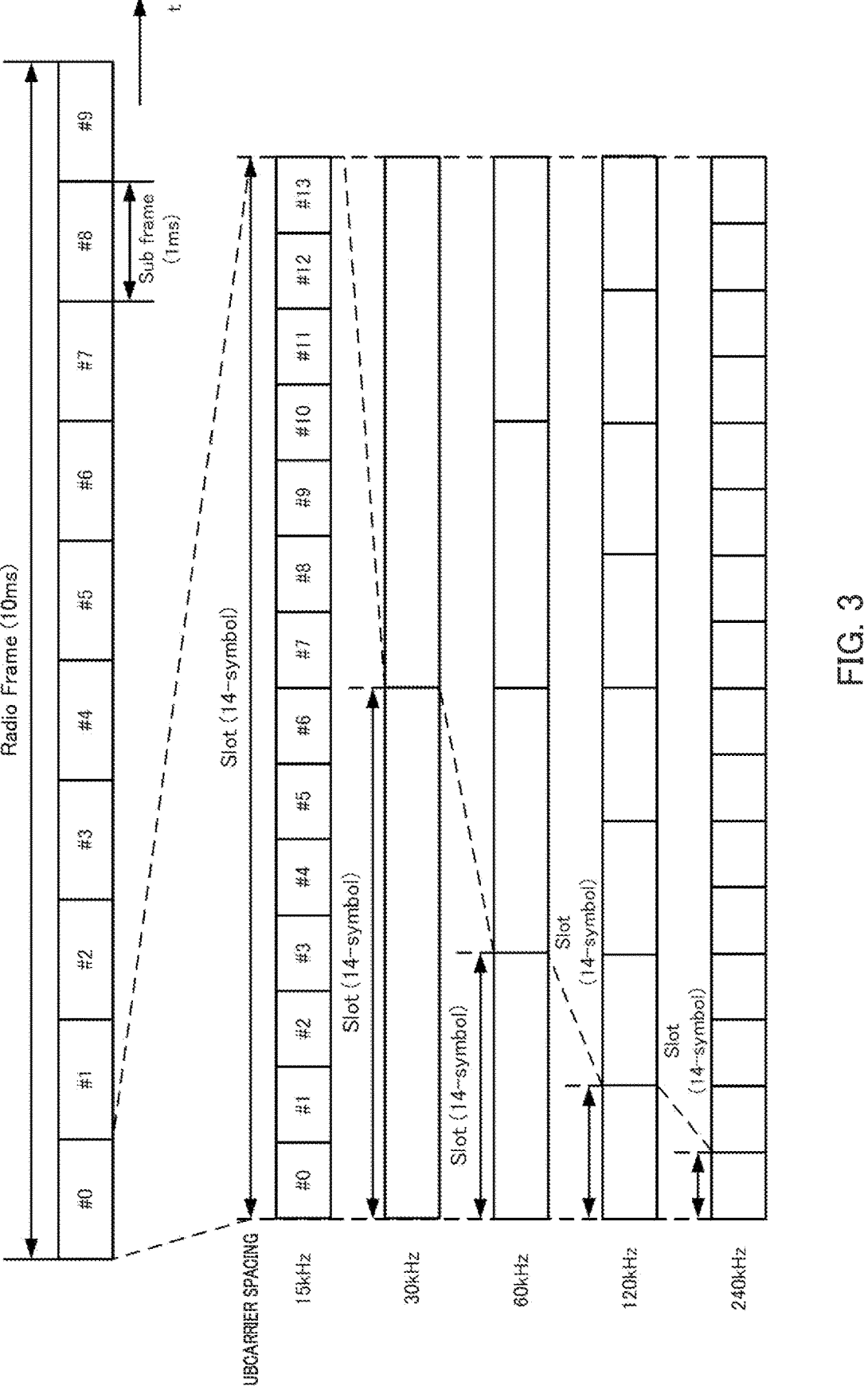
FIG. 3 illustrates an exemplary configuration of a radio frame, a subframe, and a slot used for the radio communication system.

FIG. 3 illustrates an exemplary configuration of a radio frame, a subframe, and a slot used for radio communication system 10. As illustrated in FIG. 3, one slot is composed of 14 symbols, and the symbol duration (and slot period) becomes shorter as SCS becomes larger (wider). The SCS is not limited to the spacing (frequency) illustrated in FIG. 3. For example, 480 kHz, 960 kHz or the like may be used.

Further, the number of symbols constituting one slot need not necessarily be 14 symbols (e.g., may be 28 symbols or 56 symbols). In addition, the number of slots per subframe may vary depending on SCS.

Note that time direction (t) illustrated in FIG. 3 may be referred to as a time domain, symbol duration, a symbol time, or the like. Further, the frequency direction may be also referred to as a frequency domain, a resource block, a subcarrier, a bandwidth part (BWP), or the like.

DMRS is a type of a reference signal and prepared for various types of channels. The DMRS herein may mean a DMRS for a downlink data channel, in particular, for a PDSCH, unless otherwise specified. However, a DMRS for an uplink data channel, in particular, for a PUSCH, may be interpreted as the same as the DMRS for PDSCH. Note that DMRS is an abbreviation for a Demodulation Reference Signal. PDSCH is an abbreviation for a Physical Downlink Shared Channel.

The DMRS can be used for channel-estimation in a device such as UE 200, for example, as a part of coherent demodulation. The DMRS may exist only in a resource block (RB) used for PDSCH transmission.

The DMRS may include a plurality of mapping types. Specifically, the DMRS includes mapping type A and mapping type B. In mapping type A, the first DMRS is placed in the second or third symbol of the slot. In mapping type A, the DMRS may be mapped with reference to a slot boundary regardless of where the actual data transmission is initiated in the slot. The reason that the first DMRS is placed in the second or third symbol of the slot may be interpreted as for placing the first DMRS after control resource set (CORE-SET).

In mapping type B, the first DMRS may be placed in the first symbol of the data assignment. That is, the position of the DMRS may be given relative to the position where the data is placed, rather than relative to the slot boundary.

Further, the DMRS may include a plurality of types (Type). Specifically, the DMRS includes Type 1 and Type 2. Type 1 and Type 2 differ from each other in mapping in the frequency domain and the maximum number of orthogonal reference signals. In Type 1, up to four orthogonal signals can be outputted with a single-symbol DMRS, and in Type 2, up to eight orthogonal signals can be outputted with a double-symbol DMRS.

(2) Operation of Radio Communication System

An exemplary operation of radio communication system 10 will be described. In particular, an operation regarding repetitive transmissions of a physical uplink data channel (PUSCH) supporting coverage enhancement (CE) will be described.

(2.1) Assumption

In 3GPP specifications, repetitive transmissions of PUSCH in Msg3 initial transmission has been agreed. However, there is no specific regulation on how to determine the number of repetitions of PUSCH in Msg3 initial transmission in the 3GPP specifications.

Further, in the 3GPP specifications, repetitive transmissions of PUSCH in Msg3 re-transmission has been agreed. However, there is no specific regulation on how to determine the number of repetitions of PUSCH in Msg3 re-transmission in the 3GPP specifications.

Hereinafter, a method for determining the number of repetitions of PUSCH in Msg3 initial transmission and the number of repetitions of PUSCH in Msg3 re-transmission will be described.

(2.2) Operation Overview

Operation Example 1

UE 200 determines the number of repetitions of PUSCH (Msg3 initial transmission) scheduled by RAR UL grant based on the RAR UL grant.

The RAR includes information such as a timing advance command, a UL grant, and a TC-RNTI, for example. The UL grant included in the RAR includes, for example, a bit field indicating frequency hopping of PUSCH, a bit field indicating a frequency resource, a bit field indicating a time resource, a bit field indicating a MCS, a bit field indicating TPC, a bit field indicating CSI Request, and a bit field indicating ChannelAccess-CPext.

Note that MCS is an abbreviation for a Modulation and Coding Scheme. TPC is an abbreviation for Tx power control. CSI is an abbreviation for a Channel State Indicator.

Operation Example 2

UE 200 determines the number of repetitions of PUSCH (Msg3 re-transmission) scheduled by DCI, based on the DCI scrambled by TC-RNTI.

The DCI scrambled by TC-RNTI includes a bit field indicating TPC, a bit field indicating a MCS, a bit field indicating a time resource, and a bit field indicating a HARQ process number. Note that HARQ is an abbreviation for a Hybrid automatic repeat request.

Operation Example 3

UE 200 determines the number of repetitions of Msg3 PUSCH based on predetermined mapping.

Operation Example 4

UE 200 determines a method for referring to a bit field of Msg3 UL grant in accordance with a predetermined method. UE 200 determines a method for referring to a bit field of DCI scrambled by TC-RNTI in accordance with a predetermined method.

(2.3) Operation Details

Operation Examples 1 to 4 will be hereinafter described in detail.

(2.3.1) Regarding Operation Example 1

UE 200 determines the number of repetitions of PUSCH (Msg3 initial transmission) scheduled by RAR UL grant based on information included in the RAR UL grant. For example, UE 200 may determine the number of repetitions of PUSCH (Msg3 initial transmission) based on the following methods (a) to (f). Hereinafter, the number of repetitions of PUSCH of Msg3 initial transmission is sometimes referred to as the number of repetitions of Msg3 initial transmission.

(a) UE 200 may determine the number of repetitions of Msg3 initial transmission based on an RAR reserved bit. For example, UE 200 may determine the number of repetitions of Msg3 initial transmission based on a bit value of the RAR reserved bit.

(b) UE 200 may determine the number of repetitions of Msg3 initial transmission based on a bit field indicating CSI request. For example, UE 200 may determine the number of repetitions of Msg3 initial transmission based on a bit value of the bit field indicating CSI request.

(c) UE 200 may determine the number of repetitions of Msg3 initial transmission based on a bit field indicating TPC. The determination of the number of repetitions of Msg3 initial transmission based on the bit field indicating TPC will be described in detail in Operation Example 1-1.

(d) UE 200 may determine the number of repetitions of Msg3 initial transmission based on a bit field indicating MCS. The determination of the number of repetitions of Msg3 initial transmission based on the bit field indicating MCS will be described in detail in Operation Example 1-2.

(e) UE200 may determine the number of repetitions of Msg3 initial transmission based on a bit field indicating FDRA. The determination of the number of repetitions of Msg3 initial transmission based on the bit field indicating FDRA will be described in detail in Operation Example 1-3. Note that FDRA is an abbreviation for Frequency Domain Resource Allocation.

(f) UE 200 may determine the number of repetitions of Msg3 initial transmission based on a bit field indicating TDRA. The determination of the number of repetitions of Msg3 initial transmission based on the bit field indicating TDRA will be described in detail in Operation Example 1-4. Note that TDRA is an abbreviation for Time Domain Resource Allocation.

Note that UE 200 may combine the above-described methods (a) to (f) for determining the number of repetitions to determine the number of repetitions of Msg3 initial transmission.

Further, UE 200 may receive a bit field that explicitly indicates the number of repetitions of Msg3 initial transmission. For example, RAR UL grant may include a dedicated (new) bit field indicating the number of repetitions of Msg3 initial transmission. UE 200 may determine the number of repetitions of Msg3 initial transmission based on the dedicated bit field of the received RAR UL grant.

Further, each field (value) and the number of repetitions of Msg3 initial transmission may be implicitly mapped (associated). For example, each field and the number of repetitions of Msg3 initial transmission may be mapped in accordance with a predetermined rule. Furthermore, mapping of each field and the number of repetitions of Msg3 initial transmission may be indicated to UE 200 using a system information block such as SIB 1.

In addition, UE 200 may determine the number of repetitions of Msg3 initial transmission based on a bit field indicating frequency hopping of RAR UL grant. Alternatively, UE 200 may determine the number of repetitions of Msg3 initial transmission based on a bit field indicating ChannelAccess-CPext of RAR UL grant.

(2.3.1.1) Regarding Operation Example 1-1

UE 200 may determine the number of repetitions of Msg3 initial transmission based on a bit field indicating TPC command. For example, some bits of TPC command may be used for determination of the number of repetitions of Msg3 initial transmission.

Specifically, a higher bit of TPC command may indicate the number of repetitions of Msg3 initial transmission, and the remaining lower bit may indicate TPC command. For example, higher two or one bit of TPC command may indicate the number of repetitions of Msg3 initial transmission, and the remaining lower one or two bits may indicate TPC command.

Alternatively, a higher bit of TPC command may indicate TPC command, and the remaining lower bit may indicate the number of repetitions of Msg3 initial transmission. For example, higher two or one bit of TPC command may indicate TPC command, and the remaining lower one or two bits may indicate the number of repetitions of Msg3 initial transmission.

UE 200 that has requested repetition of Msg3 initial transmission or been indicated (specified) by gNB 100 that repetition of Msg3 initial transmission is performed may perform the following Operation Example 1-1-1 or 1-1-2.

Operation Example 1-1-1

The selectable TPC may be limited. For example, when TPC command is three bits, selectable TPC is eight, but four of them may be limited.

FIG. 4 is a diagram for describing exemplary limitation of TPC command. As illustrated in frame A1 in FIG. 4, a TPC value to be selected may be positive. That is, among eight values for TPC command, four values of zero or less may be limited.

That is, in TPC command indicated by three bits, two bits may indicate TPC command, and the remaining one bit (e.g., higher one bit or lower one bit) may indicate the number of repetitions of Msg3 initial transmission. UE 200 may refer to the bit indicating the number of repetitions of Msg3 initial transmission in the TPC command indicated by three bits and determine the number of repetitions of Msg3 initial transmission.

The repetition of Msg3 initial transmission is used for PUSCH coverage enhancement. Therefore, TPC values of 0 or less may be limited as illustrated in FIG. 4. That is, even though TPC command options are limited for repetition of Msg3 initial transmission, UE 200 can suitably enhance the coverage of PUSCH in Msg3.

Note that the most significant bit of the bit field indicating TPC Command may be set to 1. When the most significant bit is set to 1, UE 200 may determine that the TPC Command is limited and that the TPC value and the number of repetitions of Msg3 initial transmission are mapped (associated) in lower two bits.

For example, when the bit field indicating TPC Command is 101 (in binary), since the most significant bit is 1, UE 200 may determine that the TPC value is four and that the number of repetitions of Msg3 initial transmission is four.

Note that, in the above description, the most significant bit of the bit field indicating TPC Command is set to 1, but the present disclosure is not limited thereto. Higher several bits (e.g., two bits) of the bit field indicating TPC Command may be set to 1.

As described above, a TPC value and the number of repetitions of Msg3 initial transmission can be mapped using the existing TPC table by setting the higher several bits of the field bit indicating TPC Command to 1.

Note that the limited number of bits (the limited number of higher bits) of the bit field of TPC Command may be indicated using DCI and/or higher layer signaling.

Further, in the above description, the TPC value indicates the number of repetitions of Msg3 initial transmission, but the present disclosure is not limited thereto. The number of repetitions of Msg3 initial transmission corresponding to the value of TPC Command may be indicated using DCI and/or higher layer signaling.

Operation Example 1-1-2

When UE 200 performs repetition of Msg3 initial transmission, a dedicated table (new table) indicating mapping of TPC command (TPC command index) referred to by UE 200 and a value may be prepared. When performing repetition of Msg3 initial transmission, UE 200 may determine a TCP value using the dedicated table and determine the number of repetitions of Msg3 initial transmission.

Note that UE 200 that has requested repetition of Msg3 initial transmission or been indicated (specified) by gNB 100 that repetition of Msg3 initial transmission is performed may determine that some bits of TPC command indicate the number of repetitions of Msg3 initial transmission based on Operation Example 1-4 to be described later. Further, the number of repetitions of Msg3 initial transmission may increase as the TPC value increases. This allows UE 200 to synergistically enhance the coverage of Msg3 initial transmission by repetition of Msg3 initial transmission and TPC.

Furthermore, the number of repetitions of Msg3 initial transmission may decrease as the TPC value increases. This allows UE 200 to reduce the number of repetitions of Msg3 initial transmission and reduce power consumption while enhancing the coverage of Msg3 initial transmission by TPC.

(2.3.1.2) Regarding Operation Example 1-2

UE 200 may determine the number of repetitions of Msg3 initial transmission based on a bit field indicating MCS. For example, some bits of MCS may be used for determination of the number of repetitions of Msg3 initial transmission.

To be more specific, the number of repetitions of Msg3 initial transmission may be indicated by higher bits of MCS (MCS field), and MCS may be indicated by the remaining lower bits. For example, the number of repetitions of Msg3 initial transmission may be indicated by higher two or three bits of MCS, and MCS may be indicated by the remaining lower three or two bits.

Alternatively, MCS may be indicated by higher bits of MCS, and the number of repetitions of Msg3 initial transmission may be indicated by the remaining lower bits. For example, MCS may be indicated by higher two or three bits of MCS, and the number of repetitions of Msg3 initial transmission may be indicated by the remaining lower three or two bits.

UE 200 that has requested repetition of Msg3 initial transmission or been indicated (specified) by gNB 100 that repetition of Msg3 initial transmission is performed may perform the following Operation Example 1-2-1 or 1-2-2.

Operation Example 1-2-1

Selectable MCS (e.g., MCS value such as Modulation Order, Target code Rate, or Spectral Efficiency) may be limited. For example, in the existing MCS table, a MCS index with a low MCS value (e.g., low Spectral Efficiency) may be selectable. In other words, use of an MCS index greater than or equal to a predetermined value may be limited. In this case, a bit representing 0 may be added to a bit higher than the most significant bit of the MCS field.

When two bits are used for indicating the MCS index, for example, four MCS indices with lower index values (e.g., 0, 1, 2, and 3) may be selectable. In this case, UE 200 may interpret that lower two bits of the MCS field indicate the MCS index and the remaining higher bits indicate bits indicating the number of repetitions of Msg3 initial transmission.

When three bits are used for indicating the MCS index, for example, eight MCS indices with lower index values (e.g., 0, 1, . . . , 7, and 8) may be selectable. In this case, UE 200 may interpret that lower three bits of the MCS field indicate the MCS index and the remaining higher bits indicate bits indicating the number of repetitions of Msg3 initial transmission.

For example, when four bits are used for indicating the MCS index, 16 MCS indices with lower index values (e.g., 0, 1, . . . , 15, and 16) may be selectable. In this case, UE 200 may interpret that the lower four bits of the MCS field indicate the MCS index and the remaining higher bits indicate bits indicating the number of repetitions of Msg3 initial transmission.

Note that higher several bits of the bit field indicating MCS may be set to 0. When the higher several bits of the bit field indicating MCS are set to 0, UE 200 may determine that the MCS is limited and that the MCS value and the number of repetitions of Msg3 initial transmission are mapped (associated) in the remaining lower bits.

For example, when higher three bits indicating MCS are set to 0, UE 200 may determine that MCS is limited. In this case, UE 200 can select from four MCS indices (e.g., 0, 1, 2, and 3) using lower two bits. UE 200 can select from four of the numbers of repetitions of Msg3 initial transmission mapped to four MCS indices.

Further, for example, when higher two bits indicating MCS are set to 0, UE 200 may determine that MCS is limited. In this case, UE 200 can select from eight MCS indices (e.g., 0, 1, . . . , 7, and 8) using lower three bits. UE 200 can select from eight of the numbers of repetitions of Msg3 initial transmission mapped to eight MCS indices.

Furthermore, when higher one bit indicating MCS is set to 0, UE 200 may determine that MCS is limited. In this case, UE 200 can select from 16 MCS indices (e.g., 0, 1, . . . , 15, and 16) using lower four bits. UE 200 can select from 16 of the numbers of repetitions of Msg3 initial transmission mapped to 16 MCS indices.

As described above, an MCS index and the number of repetitions of Msg3 initial transmission can be mapped using the existing MCS table by setting the higher several bits of the field bit indicating MCS to 0.

Note that the limited number of bits (the limited number of higher bits) of the bit field of MCS may be indicated using DCI and/or higher layer signaling.

Further, the MCS index value may indicate the number of repetitions of Msg3 initial transmission. For example, when the MCS index value is two, the number of repetitions of Msg3 initial transmission may be two. Furthermore, the number of repetitions of Msg3 initial transmission corresponding to the MCS index value may be indicated using DCI and/or higher layer signaling.

Operation Example 1-2-2

When UE200 performs repetition of Msg3 initial transmission, a dedicated MCS Table (new MCS Table) referred to by UE 200 may be prepared. When performing repetition of Msg3 initial transmission, UE 200 may determine MCS using the dedicated MCS table and determine the number of repetitions of Msg3 initial transmission.

Note that UE 200 that has requested repetition of Msg3 initial transmission or been indicated (specified) by gNB 100 that repetition of Msg3 initial transmission is performed may determine that some bits of MCS (MCS field) indicate the number of repetitions of Msg3 initial transmission based on Operation Example 1-4 to be described later.

Further, the number of repetitions of Msg3 initial transmission may increase as the MCS index (e.g., Spectral Efficiency) decreases. This allows UE 200 to enhance the coverage while enhancing the communication quality of Msg3 initial transmission.

Furthermore, the number of repetitions of Msg3 initial transmission may increase as the MCS index (e.g., Spectral Efficiency) increases. This allows UE 200 to enhance the coverage while increasing the data amount of Msg3 initial transmission.

(2.3.1.3) Regarding Operation Example 1-3

UE 200 may determine the number of repetitions of Msg3 initial transmission based on a bit field indicating FDRA.

A higher bit of FDRA may indicate the number of repetitions of Msg3 initial transmission, and the remaining lower bit may indicate frequency resource allocation (resource allocation in the frequency domain). Alternatively, a lower bit of FDRA may indicate the number of repetitions of Msg3 initial transmission, and the remaining higher bit may indicate frequency resource allocation.

UE 200 that has requested repetition of Msg3 initial transmission or been indicated (specified) by gNB 100 that repetition of Msg3 initial transmission is performed may perform the following Operation Example 1-3-1, 1-3-2, or 1-3-3.

Operation Example 1-3-1

UE 200 changes the way of reading FDRA depending on whether $N_{PRB}$ is greater than a threshold value. When $N_{PRA}$ is equal to or less than the threshold value (e.g., 127, 90, 63, or 44), in the bit field indicating FDRA, bits other than the higher bit or lower bit indicated by the following Expression 1 may be truncated. Note that $N_{PRB}$ indicates the number of resource blocks in the BWP.

$$\lceil \log_2 (N_{RB}^{UL,BWP} (N_{RB}^{UL,BWP} + 1)/2) \rceil \qquad \text{(Expression 1)}$$

The truncated bit field may be used as a bit field indicating the number of repetitions of Msg3 initial transmission. UE 200 may determine the number of repetitions of Msg3 initial transmission based on the FDRA bit field indicating the number of repetitions of Msg3 initial transmission.

When $N_{PRB}$ exceeds the threshold value, the bit field with the number of bits indicated by the following Expression 2 may be added to a higher bit in the bit field indicating the FDRA. The bit value of the bit field added to the higher bit may be set to 0.

$$\lceil \log_2 (N_{BWP}^{size} \cdot (N_{BWP}^{size} + 1)/2) - X \rceil. \qquad \text{(Expression 2)}$$

Operation Example 1-3-2

In the above-described Operation Example 1-3-1, for example, when the threshold value of $N_{PRB}$ is 127, 90, 63, or 44, 15 bits, 14 bits, 13 bits, or 12 bits may be used to indicate the FDRA as X=15, 14, 13, or 12, respectively.

For example, when the threshold value of $N_{PRB}$ is 127, 15 bits among 16 bits of the bit field of FDRA may be used to indicate the FDRA. When the threshold value of $N_{PRB}$ is 90, 14 bits among 16 bits of the bit field of FDRA may be used to indicate the FDRA. When the threshold value of $N_{PRB}$ is 63, 13 bits among 16 bits of the bit field of FDRA may be used to indicate the FDRA. When the threshold value of $N_{PRB}$ is 44, 12 bits among 16 bits of the bit field of FDRA may be used to indicate the FDRA.

Operation Example 1-3-3

In the above-described Operation Example 1-3-2, when the threshold value of $N_{PRB}$ is 127, 90, 63, or 44, for example, one, two, three, or four bits may be used to indicate the number of repetitions of Msg3 initial transmission, respectively.

For example, when the threshold value of $N_{PRB}$ is 127, one bit among 16 bits of the bit field of FDRA may be used to indicate the number of repetitions of Msg3 initial transmission. When the threshold value of $N_{PRB}$ is 90, two bits among 16 bits of the bit field of FDRA may be used to indicate the number of repetitions of Msg3 initial transmission. When the threshold value of $N_{PRB}$ is 63, three bits among 16 bits of the bit field of FDRA may be used to indicate the number of repetitions of Msg3 initial transmission. When the threshold value of $N_{PRB}$ is 44, four bits among 16 bits of the bit field of FDRA may be used to indicate the number of repetitions of Msg3 initial transmission.

Note that UE 200 that has requested repetition of Msg3 initial transmission or been indicated (specified) by gNB 100 that repetition of Msg3 initial transmission is performed may determine that some bits of FDRA indicate the number of repetitions of Msg3 initial transmission based on Operation Example 1-4 to be described later.

Further, which of 127, 90, 63, and 44 is used as the threshold value of $N_{PRB}$ may be indicated using DCI and/or higher layer signaling. Furthermore, the threshold value of $N_{PRB}$ may be also switched by DCI and/or higher layer signaling.

(2.3.1.4) Regarding Operation Example 1-4

UE 200 may determine the number of repetitions of Msg3 initial transmission based on a bit field indicating TDRA.

UE 200 that has requested repetition of Msg3 initial transmission or been indicated (specified) by gNB 100 that repetition of Msg3 initial transmission is performed may perform the following Operation Example 1-4-1, 1-4-2, or 1-4-3.

Operation Example 1-4-1

The number of repetitions of Msg3 initial transmission may be associated with a row index of a TDRA list based on a predetermined rule or an RRC configuration. The TDRA list in which the number of repetitions of Msg3 initial transmission is associated with the row index may be indicated by a system information block such as SIB 1. UE 200 may refer to the indicated TDRA list using a bit value of TDRA and determine the number of repetitions of Msg3 initial transmission. Note that RRC is an abbreviation for Radio Resource Control.

Operation Example 1-4-2

UE 200 may refer to a TDRA list that is configured (indicated) in RRC (e.g., PUSCH-ConfigCommon IE) and dedicated to UE 200, based on a bit value of the TDRA, and determine the number of Msg3 initial transmission. In this case, a parameter indicating the number of repetitions may be added to the TDRA list.

Operation Example 1-4-3

UE 200 that has requested repetition of Msg3 initial transmission or been indicated (specified) by gNB 100 that repetition of Msg3 initial transmission is performed may refer to a dedicated Default TDRA table and determine the number of repetitions of Msg3 initial transmission.

Note that UE 200 may operate as in any one of Operation Examples 1-4-1, 1-4-2, and 1-4-3 based on an RRC configuration. For example, UE 200 may operate as in Operation Example 1-4-2 when the TDRA list described in Operation Example 1-4-2 is configured, and may operate as in Operation Example 1-4-3 when the TDRA list described in Operation Example 1-4-2 is not configured.

Further, UE 200 that has requested repetition of Msg3 initial transmission or been indicated (specified) by gNB 100 that repetition of Msg3 initial transmission is performed may determine that a bit of TDRA indicates the number of repetitions of Msg3 initial transmission based on Operation Example 1-4 to be described later.

(2.3.2) Regarding Operation Example 2

UE 200 determines the number of repetitions of PUSCH (Msg3 re-transmission) scheduled by DCI based on DCI scrambled by TC-RNTI. For example, UE 200 may determine the number of repetitions of PUSCH (Msg3 re-transmission) based on the following methods (a) to (e). Hereinafter, the number of repetitions of PUSCH of Msg3 re-transmission is sometimes referred to as the number of repetitions of Msg3 re-transmission.

(a) UE 200 may determine the number of repetitions of Msg3 re-transmission based on a bit field indicating TPC. For example, UE 200 may determine the number of repetitions of Msg3 re-transmission in the same method as in Operation Example 1-1.

For example, higher one bit of the bit field indicating TPC may indicate the number of repetitions of Msg3 re-transmission, and lower one bit may indicate TPC. Alternatively, lower one bit of the bit field indicating TPC may indicate the number of repetitions of Msg3 re-transmission, and higher one bit may indicate TPC.

(b) UE 200 may determine the number of repetitions of Msg3 re-transmission based on a bit field indicating MCS. For example, UE 200 may determine the number of repetitions of Msg3 re-transmission in the same method as in Operation Example 1-2.

For example, the number of repetitions of Msg3 re-transmission may be indicated by higher one, two, or three bits of the bit field indicating MCS, and MCS may be indicated by the remaining lower four, three, or one bit. Alternatively, the number of repetitions of Msg3 re-transmission may be indicated by lower one, two, or three bits of the bit field indicating MCS, and MCS may be indicated by the remaining higher four, three, or one bit.

(c) UE 200 may determine the number of repetitions of Msg3 re-transmission based on a bit field indicating TDRA. For example, UE 200 may determine the number of repetitions of Msg3 re-transmission in the same method as in Operation Example 1-4.

(d) UE 200 may determine the number of repetitions of Msg3 re-transmission based on a bit field indicating a HARQ process number.

For example, X bit (X is any of 1, 2, and 3) among four bits of HARQ process number may indicate the number of repetitions of Msg3 re-transmission (e) As the number of repetitions of Msg3 re-transmission, a difference value from the number of repetitions of Msg3 initial transmission may be used. The difference value may be indicated by DCI. The number of repetitions of Msg3 re-transmission may be indicated as (the number of repetitions of Msg3 re-transmission)=(the number of repetitions of Msg3 initial transmission)+(the indicated difference value). For example, UE 200 may obtain the number of repetitions of Msg3 re-transmission by adding or subtracting the difference value indicated by DCI to or from the number of repetitions of Msg3 initial transmission determined based on the information included in RAR UL grant.

Note that UE 200 may combine the above-described methods (a) to (e) for determining the number of repetitions to determine the number of repetitions of Msg3 re-transmission.

(2.3.3) Regarding Operation Example 3

Hereinafter, when the number of repetitions of Msg3 initial transmission and the number of repetitions of Msg3 re-transmission are not distinguished from each other, they are sometimes simply referred to as the number of Msg3 repetitions.

UE 200 may determine the number of Msg3 repetitions from predetermined mapping based on a bit indicating the number of Msg3 repetitions.

FIGS. 5A to 5C each illustrate exemplary mapping of a bit indicating the number of repetitions and the number of repetitions. FIGS. 5A to 5C indicate cases where the length of the bit sequence indicating the number of Msg3 repetitions is one bit.

The term "bit field" illustrated in FIGS. 5A to 5C corresponds to the bit field indicating the number of repetitions described in Operation Examples 1-1, 1-2, and 1-3. The number of repetitions may be one as illustrated in FIG. 5A.

FIGS. 6A to 6E each illustrate exemplary mapping of a bit indicating the number of repetitions and the number of repetitions. FIGS. 6A to 6E indicate cases where the length of the bit sequence indicating the number of Msg3 repetitions is two bits.

The term "bit field" illustrated in FIGS. 6A to 6E corresponds to the bit field indicating the number of repetitions described in Operation Examples 1-1, 1-2, and 1-3. The number of repetitions may be one as illustrated in FIGS. 6A and 6B

FIGS. 7A and 7B each illustrate exemplary mapping of a bit indicating the number of repetitions and the number of repetitions. FIGS. 7A to 7B indicate cases where the length of the bit sequence indicating the number of Msg3 repetitions is three bits.

The term "bit field" illustrated in FIGS. 7A and 7B corresponds to the bit field indicating the number of repetitions described in Operation Examples 1-1, 1-2, and 1-3.

FIG. 8 illustrates exemplary mapping of a bit indicating the number of repetitions and the number of repetitions. FIG. 8 indicates a case where the length of the bit sequence indicating the number of Msg3 repetitions is four bits.

The term "bit field" illustrated in FIG. 8 corresponds to the bit field indicating the number of repetitions described in Operation Examples 1-1, 1-2, and 1-3.

Note that the exemplary mapping of a bit indicating the number of repetitions and the number of repetitions is not limited to the examples illustrated in FIGS. 5A to 5C, FIGS. 6A to 6E, FIGS. 7A and 7B, and FIG. 8.

(2.3.4) Regarding Operation Example 4

UE 200 determines a method for referring to a bit field of Msg3 UL grant in accordance with a predetermined method (Operation Example 4-1). UE 200 determines a method for referring to a bit field of DCI scrambled by TC-RNTI in accordance with a predetermined method (Operation Example 4-2).

(2.3.4.1) Regarding Operation Example 4-1

After requesting repetition of Msg3 at the time of PRACH transmission, in order to determine the number of Msg3 repetitions, UE 200 may refer to a bit field of RAR UL grant in a different method based on whether the Msg3 repetition is performed. For example, UE 200 may determine whether to refer to a predetermined bit field of RAR UL grant, such as TPC or MCS, as usual or as associated with the number of Msg3 repetitions, based on whether the Msg3 repetition is performed. Note that PRACH is an abbreviation for a physical random access channel.

UE 200 may determine a method for referring to the bit field of RAR UL grant (whether the method is a usual reference method or not) by the following methods (a) to (d).

(a) UE 200 may determine a method for referring to a bit field of RAR UL grant based on a reserve bit of RAR.

(b) UE 200 may determine a method for referring to a bit field of RAR UL grant based on a bit field indicating CSI request.

(c) UE 200 may determine a method for referring to a bit field of RAR UL grant based on a reserved bit of RAR MAC sub header. Note that MAC is an abbreviation for Medium Access Control.

(d) After requesting repetition of Msg3 initial transmission or being indicated (specified) by gNB 100 that repetition of Msg3 initial transmission is performed, UE 200 may determine that a predetermined bit field of RAR UL grant is associated with the number of repetitions of Msg3 initial transmission and refer to the predetermined bit field of RAR UL grant. For example, UE 200 that has requested or been indicated the repetition may determine that a predetermined bit field of RAR UL grant is associated with the number of repetitions of Msg3 initial transmission and refer to the predetermined bit field of RAR UL grant, without referring to the information described in the above (a) to (c).

(2.3.4.2) Regarding Operation Example 4-2

After requesting repetition of Msg3 at the time of PRACH transmission, in order to determine the number of Msg3 repetitions, UE 200 may refer to a bit field of DCI scrambled by TC-RNTI in a different method based on whether the Msg3 repetition is performed. For example, UE 200 may determine whether to refer to a predetermined bit field of DCI, such as TPC or MCS, as usual or as associated with the number of Msg3 repetitions, based on whether the Msg3 repetition is performed.

UE 200 may determine a method for referring to a bit field of DCI (whether the method is a usual reference method or not) by the following methods (a) to (d).

(a) UE 200 may determine a method for referring to a bit field of DCI in the same method as in Operation Example 4-1. For example, UE 200 may also apply the content (information) indicated in Operation Example 4-1 to re-transmission.

(b) UE 200 may determine a method for referring to a bit field of DCI based on a bit field indicating a HARQ process number.

(c) UE 200 may determine a method for referring to a bit field of DCI based on a bit field indicating a New data indicator.

(d) After requesting repetition of Msg3 re-transmission or being indicated (specified) by gNB 100 that repetition of Msg3 re-transmission is performed, UE 200 may determine that a predetermined bit field of DCI is associated with the number of repetitions of Msg3 re-transmission and refer to the predetermined bit field of DCI. For example, UE 200 that has requested or been indicated the repetition may determine that a predetermined bit field of DCI is associated with the number of repetitions of Msg3 re-transmission and refer to the predetermined bit field of DCI, without referring to the information described in the above (a) to (c).

(3) Functional Block Configuration of Radio Communication System

Next, a functional block configuration of radio communication system 10 will be described.

(3.1) Configuration of UE

Figure 9:
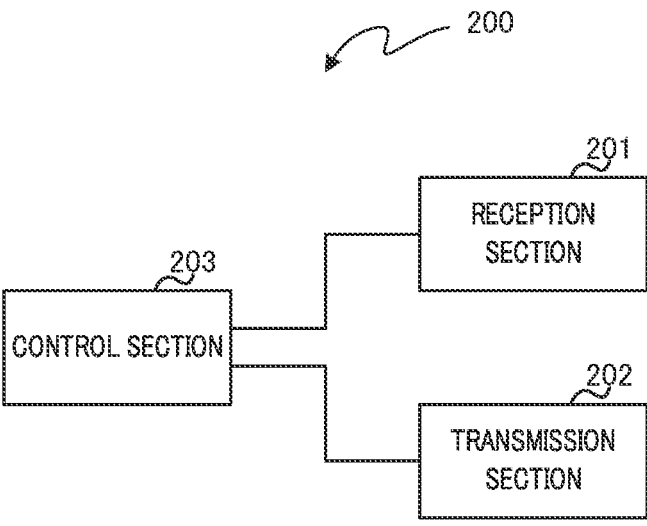
FIG. 9 is a block diagram illustrating an exemplary configuration of a UE.

FIG. 9 is a block diagram illustrating an exemplary configuration of UE 200. UE 200 includes, for example, reception section 201, transmission section 202, and control section 203. UE 200 communicates with gNB 100 by radio, for example.

Reception section 201 receives a Downlink (DL) signal transmitted from gMB100. For example, reception section 201 receives the DL signal under the control of control section 203.

Transmission section 202 transmits an Uplink (UL) signal to gNB 100. For example, transmission section 202 transmits the UL signal under the control of control section 203.

The UL signal may include an uplink data signal and control information (e.g., DCI), for example. For example, the UL signal may include information on processing capabilities of terminal 200 (e.g., UE capability). Further, the UL signal may include a reference signal.

Channels used for UL signal transmission include, for example, data channels and control channels. For example, the data channels include a Physical Uplink Shared Channel (PUSCH) and the control channels include a Physical Uplink Control Channel (PUCCH). For example, UE 200 receives control information from gNB 100 using a PUCCH and transmits an uplink data signal using a PUSCH The reference signal included in the UL signal may include, for example, at least one of a DMRS, a Phase Tracking Reference Signal (PTRS), a Channel State Information-Reference Signal (CSI-RS), a Sounding Reference Signal (SRS), and a Positioning Reference Signal (PRS) for positional information. For example, the reference signals such as the DMRS and the PTRS are used for demodulating an uplink data signal and transmitted using a PUSCH.

Control section 203 controls communication operations of UE 200 including reception processing in reception section 201 and transmission processing in transmission section 202.

For example, control section 203 acquires data and information such as control information from a higher layer, and outputs the data and control information to transmission section 202. Further, control section 203 outputs, for example, data, control information and/or the like received from reception section 201 to a higher layer.

Control section 203 may determine the number of repetitions of PUSCH of Msg3 initial transmission scheduled by UL grant based on information included in the UL grant included in Msg2 of the RACH procedure. The information included in the UL grant is information indicating characteristics of PUSCH of Msg3 initial transmission, and may be, for example, information such as TPC, an MCS, FDRA and TDRA.

Control section 203 may determine the number of repetitions of PUSCH of Msg3 initial transmission based on a bit value of the information indicating the characteristics of PUSCH of Msg3 initial transmission. For example, control section 203 may determine the number of repetitions of the PUSCH based on the bit value of the bit field of the information indicating the characteristics of the PUSCH, such as TPC, an MCS, FDRA, and TDRA. When control section 203 has requested the repetitive transmissions of PUSCH of Msg3 initial transmission or been indicated that the repetitive transmissions of PUSCH of Msg3 initial transmission is performed, control section 203 may use the bit value as the number of repetitions of PUSCH of Msg3 initial transmission.

Further, for example, control section 203 may determine the number of repetitions of Msg3 PUSCH based on DCI that has scheduled re-transmission of PUSCH (Msg3 re-transmission) in the RACH procedure. The DCI includes information indicating characteristics of PUSCH of Msg3 re-transmission, and may include information such as TPC, an MCS, and TDRA, for example.

Control section 203 may determine the number of repetitions of PUSCH of Msg3 re-transmission based on a bit value of the information indicating the characteristics of PUSCH of Msg3 re-transmission. For example, control section 203 may determine the number of repetitions of the PUSCH of Msg3 re-transmission based on the bit value of the bit field of DCI indicating the characteristics of the PUSCH, such as TPC, an MCS, FDRA, and TDRA. When control section 203 has requested the repetitive transmissions of PUSCH of Msg3 re-transmission or been indicated that the repetitive transmissions of PUSCH of Msg3 re-transmission is performed, control section 203 may use the bit value as the number of repetitions of PUSCH of Msg3 re-transmission.

Note that the Msg2 may be referred to as a response message. The PUSCH may be referred to as an uplink signal. Further, the term "number of repetitions" of Msg3 PUSCH may be referred to as the "number of repetitive transmissions."

Further, note that the channels used for DL signal transmission and the channels used for UL signal transmission are not limited to the examples described above. For example, the channels used for DL signal transmission and the channels used for UL signal transmission may include a RACH and a PBCH. The RACH may be used, for example, to transmit DCI including Random Access-RNTI (RA-RNTI). Note that PBCH is an abbreviation for a Physical Broadcast Channel.

Furthermore, various types of repetitive PUSCH transmissions may be defined. In particular, Repetition type A and Repetition type B may be defined. Repetition type A may be interpreted as a form in which a PUSCH allocated in a slot is repeatedly transmitted. That is, the PUSCH is 14 symbols or less, and there is no possibility that the PUSCH is allocated across a plurality of slots (adjacent slots).

On the other hand, Repetition type B may be interpreted as repetitive PUSCH transmissions in which a PUSCH of 15 symbols or more is possibly allocated. In the present embodiment, allocation of such a PUSCH across a plurality of slots may be permitted.

Further, control section 203 may transmit a random access preamble as the first message (hereinafter, referred to as Msg1) in the RACH procedure.

Control section 203 may receive the second message (hereinafter, referred to as Msg2) as a response message (random access response (RAR)) to Msg1 in the RACH procedure.

After receiving Msg2, control section 203 may transmit the third message (hereinafter, referred to as Msg3) through a PUSCH in the RACH procedure.

Control section 203 may receive the fourth message (hereinafter, Msg4) as a response message to Msg3 in the RACH procedure (3GPP TS38.321 V16.2.1 § 5.1 "Random Access procedure).

For example, Msg1 may be transmitted through a PRACH. Msg1 may be referred to as a PRACH Preamble. Msg2 may be transmitted through a PDSCH. Msg2 may be referred to as a Random Access Response (RAR). Msg3 may be referred to as an RRC Connection Request. Msg4 may be referred to as an RRC Connection Setup.

(3.2) Configuration of gNB

Figure 10:
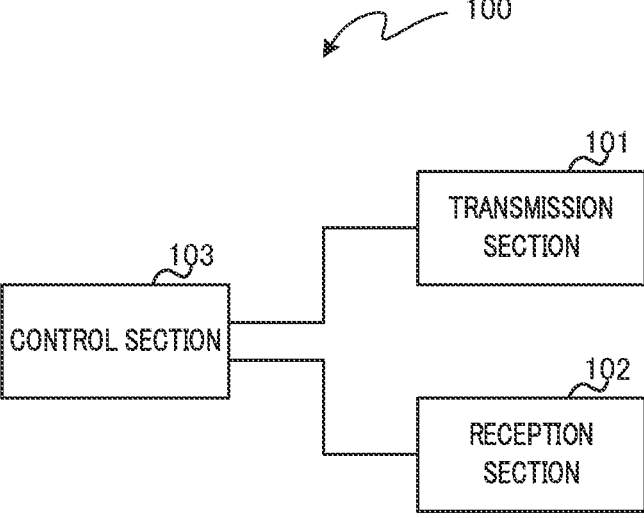
FIG. 10 is a block diagram illustrating an exemplary configuration of a gNB.

FIG. 10 is a block diagram illustrating an exemplary configuration of gNB 100. For example, gNB100 includes transmission section 101, reception section 102, and control section 103. Further, gNB 100 communicates with UE 200 by radio (see FIG. 9).

Transmission section 101 transmits a DL signal to UE 200. For example, transmission section 101 transmits the DL signal under the control of control section 103.

The DL signal may include, for example, a downlink data signal and control information. Further, the DL signal may include information (e.g., UL grant) indicating scheduling related to signal transmission of UE 200. Furthermore, the DL signal may include higher layer control information (e.g., control information of Radio Resource Control). In addition, the DL signal may include a reference signal.

Channels used for DL signal transmission include, for example, data channels and control channels. For example, the data channels may include a PDSCH, and the control channels may include a PDCCH. For example, gNB100 transmits control information to UE 200 using a PDCCH and transmits a downlink data signal using a PDSCH.

The reference signal included in the DL signal may include, for example, at least one of a DMRS, a PTRS, a CSI-RS, a SRS, and a PRS. For example, the reference signals such as the DMRS and the PTRS are used for demodulating a downlink data signal and transmitted using a PDSCH.

Reception section 102 receives a UL signal transmitted from UE 200. For example, reception section 102 receives the UL signal under the control of control section 103.

Control section 103 controls communication operations of eNB 100 including transmission processing of transmission section 101 and reception processing of reception section 102.

For example, control section 103 acquires data and information such as control information from a higher layer, and outputs the data and information to transmission section 101. Further, control section 103 outputs data, control information and/or the like received from reception section 102 to a higher layer.

(4) Operation and Effects

According to the above-described embodiment, UE 200 receives Msg2 in a RACH procedure and determines the number of repetitions of Msg3 initial transmission scheduled by UL grant based on the information included in the UL grant included in the Msg2. Accordingly, UE 200 can appropriately determine the number of repetitions of Msg3 initial transmission. Further, since UE 200 can appropriately determine the number of repetitions of Msg3 initial transmission, the coverage of Msg3 initial transmission can be enhanced.

According to the above-described embodiment, UE 200 receives DCI that has scheduled re-transmission of Msg3 (Msg3 re-transmission) in the RACH procedure and determines the number of repetitions of Msg3 re-transmission based on the DCI. Thus, UE 200 can appropriately determine the number of repetitions of Msg3 re-transmission. Further, since UE 200 can appropriately determine the number of repetitions of Msg3 re-transmission, the coverage of Msg3 re-transmission can be enhanced.

(5) Variation

The operation examples described in above (2.3) may be configured for each cell based on a system information block such as SIB 1. For example, UE 200 in a certain cell may be configured based on Operation Example 1-1, and UE 200 in another cell may be configured to operate based on Operation Example 1-3.

Further, in UE 200, the operation examples described in above (2.3) may be switched. For example, in UE 200, an operation of Operation Example 1-1 may be switched to an operation of Operation Example 1-2 based on DCI and/or higher layer signaling.

The present disclosure has been described above.
<Hardware Configuration and the Like>

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (e.g., via wires or radioly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmission section," "transmitting unit," or "transmitter." The methods for implementing the functions are not limited specifically as described above.

Figure 11:
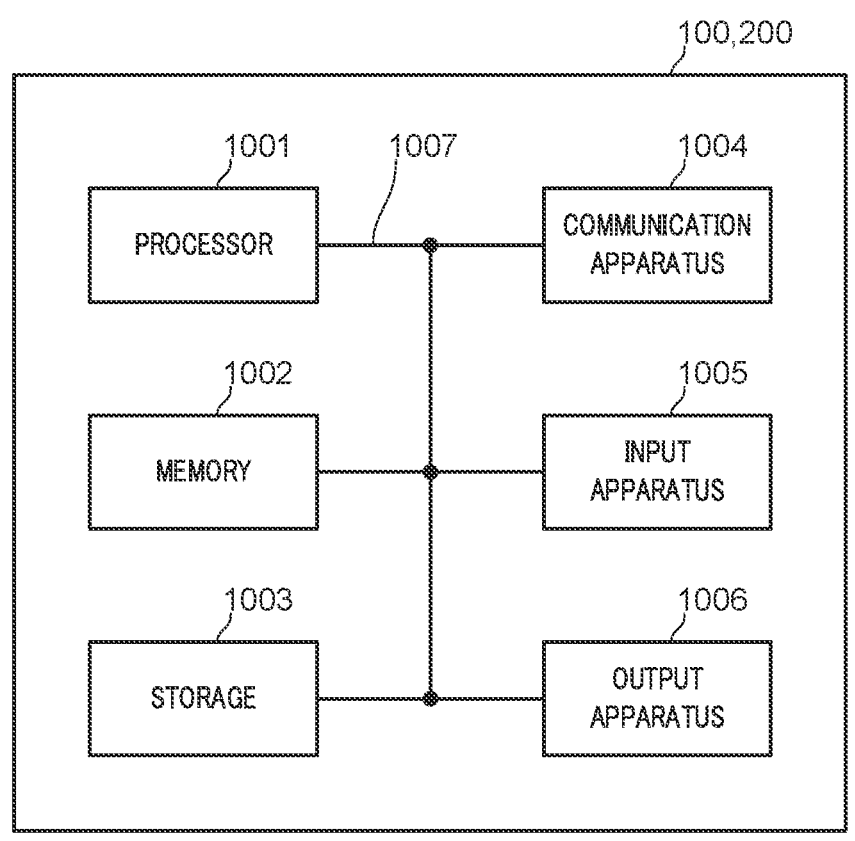
FIG. 11 illustrates an exemplary hardware configuration of the gNB and the UE according to the embodiment.

For example, gNB 100, UE 200, and the like according to an embodiment of the present disclosure may function as a computer that executes processing of a radio communication method of the present disclosure. FIG. 11 illustrates an exemplary hardware configuration of gNB 100 and UE 200. Physically, gNB 100 and UE 200 as described above may be each a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of gNB 100 and UE 200 may each include one apparatus or a plurality of apparatuses illustrated in the drawings or may not include part of the apparatuses.

The functions of gNB 100 and UE 200 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, the above-described control sections 103 and 203 may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiment is used. For example, control sections 103 and 203 of UE 200 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that, the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a CD-ROM (Compact Disc ROM), a hard disk drive, a flexible disk, a magneto-optical disk (e.g., a compact disc, a digital versatile disc, or a Blue-ray (registered trademark) disc), a smart card, a flash memory (e.g., a card, a stick, or a key drive), a floppy (registered trademark) disk, and a magnetic strip. Storage 1003 may also be called an auxiliary storage apparatus. The storage medium as described above may be, for example, a database, a server or other appropriate media including at least one of memory 1002 and storage 1003.

Communication apparatus 1004 is hardware (transmission and reception device) for communication between computers through at least one of wired and radio networks and is also called, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, transmission section 101, reception section 102, reception section 201, and transmission section 202, and the like as described above may be realized by communication apparatus 1004. Communication apparatus 1004 may be implemented by physically or logically separating the transmission section and the reception section.

Input apparatus 1005 is an input device (e.g., a keyboard, a mouse, a microphone, a switch, a button, or a sensor) that receives input from the outside. Output apparatus 1006 is an output device (e.g., a display, a speaker, or an LED lamp) which makes outputs to the outside. Note that input apparatus 1005 and output apparatus 1006 may be integrated (e.g., a touch panel).

The apparatuses, such as processor 1001, memory 1002 and the like, are connected by bus 1007 for communication of information. Bus 1007 may be configured using one bus or using buses different between each pair of the apparatuses.

Further, gNB 100 and UE 200 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

<Notification and Signaling of Information>

The notification of information is not limited to the embodiment described in the present disclosure, and the information may be notified by another method. For example, the notification of information may be carried out by one or a combination of physical layer signaling (e.g., Downlink Control Information (DCI) and Uplink Control Information (UCI)), higher layer signaling (e.g., Radio Resource Control (RRC) signaling, Medium Access Control (MAC) signaling, notification information (Master Information Block (MIB) and System Information Block (SIB))), and other signals. The RRC signaling may be called an RRC message and may be, for example, an RRC connection setup message, an RRC connection reconfiguration message, or the like.

<Application System>

Each aspect/embodiment described in the present disclosure may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UMB (Ultra-WideBand), Bluetooth (registered trademark), or other appropriate systems and a next-generation system extended based on the above systems. Additionally or alternatively, a combination of two or more of the systems (e.g., a combination of at least one of LTE and LTE-A and 5G) may be applied.

<Processing Procedure and the Like>

The orders of the processing procedures, the sequences, the flow charts, and the like of the aspects and embodiment described in the present disclosure may be changed as long as there is no contradiction. For example, elements of various steps are presented in exemplary orders in the methods described in the present disclosure, and the methods are not limited to the presented specific orders.

<Operation of Base Station>

Specific operations which are described in the present disclosure as being performed by the base station may sometimes be performed by a higher node (upper node) depending on the situation. Various operations performed for communication with a terminal in a network constituted by one network node or a plurality of network nodes including a base station can be obviously performed by at least one of the base station and a network node other than the base station (examples include, but not limited to, MME and S-GW). Although there is one network node in addition to the base station in the case illustrated above, a plurality of other network nodes may be combined (e.g., MME and S-GW).

<Direction of Input and Output>

The information or the like (see the item of "Information and Signals") can be output from a higher layer (or a lower layer) to a lower layer (or a higher layer). The information or the like may be input and output through a plurality of network nodes.

<Handling of Input and Output Information and the Like>

The input and output information and the like may be saved in a specific place (e.g., memory) or may be managed using a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (e.g., comparison with a predetermined value).

Variations and the Like of Aspects

The aspects and embodiment described in the present disclosure may be independently used, may be used in combination, or may be switched and used along the execution. Further, notification of predetermined information (e.g., notification indicating "it is X") is not limited to explicit notification, and may be performed implicitly (e.g., by not notifying the predetermined information).

While the present disclosure has been described in detail, it is obvious to those skilled in the art that the present disclosure is not limited to the embodiment described in the present disclosure. Modifications and variations of the aspects of the present disclosure can be made without departing from the spirit and the scope of the present disclosure defined by the description of the appended claims. Therefore, the description in the present disclosure is intended for exemplary description and does not limit the present disclosure in any sense.

<Software>

Regardless of whether the software is called software, firmware, middleware, a microcode, or a hardware descrip-tion language or by another name, the software should be broadly interpreted to mean instruction, an instruction set, a code, a code segment, a program code, a program, a sub-program, a software module, an application, a software application, a software package, a routine, a subroutine, an object, an executable file, an execution thread, a procedure, a function, and the like.

The software, the instruction, the information and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a radio technique (e.g., an infrared ray and a microwave), the at least one of the wired technique and the radio technique is included in the definition of the transmission medium.

<Information and Signals>

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that, the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

<System and Network>

The terms "system" and "network" used in the present disclosure can be interchangeably used.

<Names of Parameters and Channels>

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (e.g., PUCCH and PDCCH) and information elements can be identified by any suitable names, and various names allocated to these various channels and information elements are not limitative in any respect.

<Base Station>

The terms "base station (BS)", "wireless base station", "fixed station", "NodeB", "eNodeB (eNB)," "gNodeB (gNB)," "access point," "transmission point," "reception point," "transmission/reception point," "cell," "sector," "cell group," "carrier," and "component carrier" may be used interchangeably in the present disclosure. The base station may be called a macro cell, a small cell, a femtocell, or a pico cell.

The base station can accommodate one cell or a plurality of (e.g., three) cells. When the base station accommodates a plurality of cells, the entire coverage area of the base station can be divided into a plurality of smaller areas, and each of the smaller areas can provide a communication service based on a base station subsystem (e.g., small base station for indoor (RRH: Remote Radio Head)). The term "cell" or "sector" denotes part or all of the coverage area of at least one of the base station and the base station subsystem that perform the communication service in the coverage.

<Mobile Station>

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or by some other appropriate terms.

<Base Station/Mobile Station>

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be IoT (Internet of Things) equipment such as a sensor.

The base station in the present disclosure may also be replaced with the user terminal. For example, the embodiment of the present disclosure may find application in a configuration that results from replacing communication between the base station and the user terminal with communication between multiple user terminals (such communication may, e.g., be referred to as D2D (Device-to-Device), V2X (Vehicle-to-Everything), or the like). In this case, UE 200 may be configured to have the functions that gNB 100 described above has. The wordings "uplink" and "downlink" may be replaced with a corresponding wording for inter-terminal communication (e.g., "side"). For example, an uplink channel, a downlink channel, and the like may be replaced with a side channel.

Similarly, the user terminal in the present disclosure may be replaced with the base station. In this case, gNB 100 may be configured to have the functions that UE 200 described above has.

Meaning and Interpretation of Terms

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

<Reference Signal>

The reference signal can also be abbreviated to an RS and may also be called a pilot depending on the applied standard.

<Meaning of "Based On">

The description "based on" used in the present disclosure does not mean "based only on," unless otherwise specified. In other words, the description "based on" means both of "based only on" and "based at least on."

<"First" and "Second">

Any reference to elements by using the terms "first," "second," and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

<Means>

The "means" in the configuration of each apparatus described above may be replaced with "section," "circuit," "device," or the like.

<Open Form>

In a case where terms "include," "including," and their modifications are used in the present disclosure, these terms are intended to be inclusive like the term "comprising." Further, the term "or" used in the present disclosure is not intended to be an exclusive or.

<Time Units such as TTI, Frequency Units such as RB, and Radio Frame Configuration>

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology indicates, for example, at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM) symbol, Single Carrier-Frequency Division Multiple Access (SC-FDMA) symbol, or the like) in the time domain. The slot may also be a time unit based on the numerology.

The slot may include a plurality of mini-slots. Each of the mini slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini-slot, and the symbol indicate time units in transmitting signals. The radio frame, the subframe, the slot, the mini-slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (e.g., 1 to 13 symbols) that is shorter than 1 ms, or a duration that is longer than 1 ms. Note that, a unit that represents the TTI may be referred to as a slot, a mini-slot or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that can be used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (e.g., the number of symbols) to which the transport block, the code block, the codeword or the like is actually mapped may be shorter than the TTI.

Note that, in a case where one slot or one mini-slot is referred to as the TTI, one or more TTIs (that is, one or more slots or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that, the long TTI (e.g., the usual TTI, the subframe, or the like) may be replaced with the TTI that has a time length which exceeds 1 ms, and the short TTI (e.g., the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini-slot, one subframe, or one TTI. One TTI and one subframe may be constituted by one resource block or a plurality of resource blocks.

Note that, one or more RBs may be referred to as a Physical Resource Block (PRB: Physical RB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common RBs (common resource blocks) for certain numerology in a certain carrier. Here, the common RBs may be identified by RB indices that use a common reference point of the carrier as a reference. The PRB may be defined by a certain BWP and may be numbered within the BWP.

The BWP may include a BWP for UL (UL BWP) and a BWP for DL (DL BWP). A UE may be configured with one or more BWPs within one carrier.

At least one of the configured BWPs may be active, and the UE does not have to assume transmission/reception of a predetermined signal or channel outside the active BWP. Note that, "cell," "carrier" and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

<Maximum Transmit Power>

The "maximum transmit power" described in the present disclosure may mean a maximum value of the transmit power, the nominal UE maximum transmit power, or the rated UE maximum transmit power.

<Article>

In a case where articles, such as "a", "an", and "the" in English, for example, are added in the present disclosure by translation, nouns following these articles may have the same meaning as used in the plural.

<"Different">

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

INDUSTRIAL APPLICABILITY

The present disclosure is useful for a radio communication system.

REFERENCE SIGNS LIST

10 Radio Communication System
20 NG-RAN
100 gNB
200 UE

27

101, 202 Transmission section
102, 201 Reception section
103, 203 Control section
1001 Processor
1002 Memory
1003 Storage
1004 Communication apparatus
1005 Input apparatus
1006 Output apparatus
1007 Bus

The invention claimed is:

1. A terminal, comprising:
a transmission section transmitter that requests repetition of an uplink signal;
a reception section receiver that receives an information field for a modulation and coding scheme; and
a control section processor that determines a number of the repetitions of the uplink signal based on a higher bit of the information field and determines an index of the modulation and coding scheme based on a lower bit of the information field,
wherein the processor:
determines the number of the repetitions of the uplink signal based on a higher bit of the information field included in an uplink grant in a response of random access,
determines the index of the modulation and coding scheme based on a lower bit of the information field included in the uplink grant,
determines the number of the repetitions of the uplink signal based on higher two bits of the information field, and
determines the index of the modulation and coding scheme based on lower two bits of the information field.

2. The terminal according to claim 1, wherein the control section processor determines the index of any of 0 to 3 based on lower two bits of the information field included in the uplink grant.

3. The terminal according to claim 1, wherein,
the processor control section:
determines the number of the repetitions of the uplink signal based on a higher bit of the information field included in downlink control information, and
determines the index based on a lower bit of the information field included in the downlink control information.

4. The terminal according to claim 3, wherein,
the processor control section:
determines the number of the repetitions of the uplink signal based on higher two bits of the information field, and
determines the index based on lower three bits of the information field.

5. The terminal according to claim 4, wherein the processor control section determines the index of any of 0 to 7 based on lower three bits of the information field included in the downlink control information.

6. The terminal according to claim 3, wherein the downlink control information is scrambled by a temporary cell radio network temporary identifier (TC-RNTI).

7. The terminal according to claim 1, wherein the processor control section determines, based on a lower bit of the information field, one of a plurality of lower candidate values among a plurality of candidate values for the index.

28

8. A base station, comprising:
a reception section receiver that receives a request for repetition of an uplink signal from a terminal;
a transmission section transmitter that transmits an information field for a modulation and coding scheme to the terminal; and
a control section processor that includes a number of the repetitions of the uplink signal in a higher bit of the information field and includes an index of the modulation and coding scheme in a lower bit of the information field,
wherein the processor:
includes the number of the repetitions of the uplink signal in a higher bit of the information field included in an uplink grant in a response of random access, for determination of the number of the repetitions of the uplink signal by the terminal,
includes the index of the modulation and coding scheme in a lower bit of the information field included in the uplink grant, for determination of the index of the modulation and coding scheme by the terminal,
includes the number of the repetitions of the uplink signal in higher two bits of the information field, for determination of the number of the repetitions of the uplink signal by the terminal, and
includes the index of the modulation and coding scheme in lower two bits of the information field, for determination of the index of the modulation and coding scheme by the terminal.

9. A radio system, comprising:
a terminal comprising:
a transmission section transmitter that requests repetition of an uplink signal;
a reception section receiver that receives an information field for a modulation and coding scheme; and
a control section processor that determines a number of the repetitions of the uplink signal based on a higher bit of the information field and determines an index of the modulation and coding scheme based on a lower bit of the information field,
wherein the processor of the terminal:
determines the number of the repetitions of the uplink signal based on a higher bit of the information field included in an uplink grant in a response of random access,
determines the index of the modulation and coding scheme based on a lower bit of the information field included in the uplink grant,
determines the number of the repetitions of the uplink signal based on higher two bits of the information field, and
determines the index of the modulation and coding scheme based on lower two bits of the information field; and
a base station comprising:
a reception section receiver that receives a request for the repetition of the uplink signal;
a transmission section transmitter that transmits the information field for the modulation and coding scheme; and
a control section processor that includes the number of the repetitions of the uplink signal in the higher bit of the information field and includes the index of the modulation and coding scheme in the lower bit of the information field, wherein the processor of the base station:

includes the number of the repetitions of the uplink signal in the higher bit of the information field included in the uplink grant in the response of random access, includes the index of the modulation and coding scheme in the lower bit of the information field included in the uplink grant, includes the number of the repetitions of the uplink signal in the higher two bits of the information field, and includes the index of the modulation and coding scheme in the lower two bits of the information field.

10. A communication method, comprising:

requesting, by a terminal, repetition of an uplink signal;

receiving, by the terminal, an information field for a modulation and coding scheme; and determining, by the terminal, a number of the repetitions of the uplink signal based on a higher bit of the information field and determining, by the terminal, an index of the modulation and coding scheme based on a lower bit of the information field, wherein the terminal:

determines the number of the repetitions of the uplink signal based on a higher bit of the information field included in an uplink grant in a response of random access, determines the index of the modulation and coding scheme based on a lower bit of the information field included in the uplink grant, determines the number of the repetitions of the uplink signal based on higher two bits of the information field, and determines the index of the modulation and coding scheme based on lower two bits of the information field.

11. A communication method, comprising:

receiving, by a base station, a request for repetition of an uplink signal from a terminal;

transmitting, by the base station, an information field for a modulation and coding scheme to the terminal; and including, by the base station, a number of the repetitions of the uplink signal in a higher bit of the information field and including, by the base station, an index of the modulation and coding scheme in a lower bit of the information field, wherein the base station:

includes the number of the repetitions of the uplink signal in a higher bit of the information field included in an uplink grant in a response of random access, for determination of the number of the repetitions of the uplink signal by the terminal, includes the index of the modulation and coding scheme in a lower bit of the information field included in the uplink grant, for determination of the index of the modulation and coding scheme by the terminal, includes the number of the repetitions of the uplink signal in higher two bits of the information field, for determination of the number of the repetitions of the uplink signal by the terminal, and includes the index of the modulation and coding scheme in lower two bits of the information field, for determination of the index of the modulation and coding scheme by the terminal.

12. A communication method for a radio system, the method comprising:

requesting, by a terminal, repetition of an uplink signal;

receiving, by the terminal, an information field for a modulation and coding scheme;

determining, by the terminal, a number of the repetitions of the uplink signal based on a higher bit of the information field and determining, by the terminal, an index of the modulation and coding scheme based on a lower bit of the information field, wherein the terminal:

determines the number of the repetitions of the uplink signal based on a higher bit of the information field included in an uplink grant in a response of random access, determines the index of the modulation and coding scheme based on a lower bit of the information field included in the uplink grant, determines the number of the repetitions of the uplink signal based on higher two bits of the information field, and determines the index of the modulation and coding scheme based on lower two bits of the information field;

receiving, by a base station, a request for the repetition of the uplink signal;

transmitting, by the base station, the information field for the modulation and coding scheme; and including, by the base station, the number of the repetitions of the uplink signal in the higher bit of the information field and including, by the base station, the index of the modulation and coding scheme in the lower bit of the information field, wherein the base station:

includes the number of the repetitions of the uplink signal in the higher bit of the information field included in the uplink grant in the response of random access, includes the index of the modulation and coding scheme in the lower bit of the information field included in the uplink grant, includes the number of the repetitions of the uplink signal in the higher two bits of the information field, and includes the index of the modulation and coding scheme in the lower two bits of the information field.

* * * * *